July 27, 1965  F. L. HILL ETAL  3,196,954
TOMATO HARVESTER
Filed July 1, 1963  2 Sheets-Sheet 2
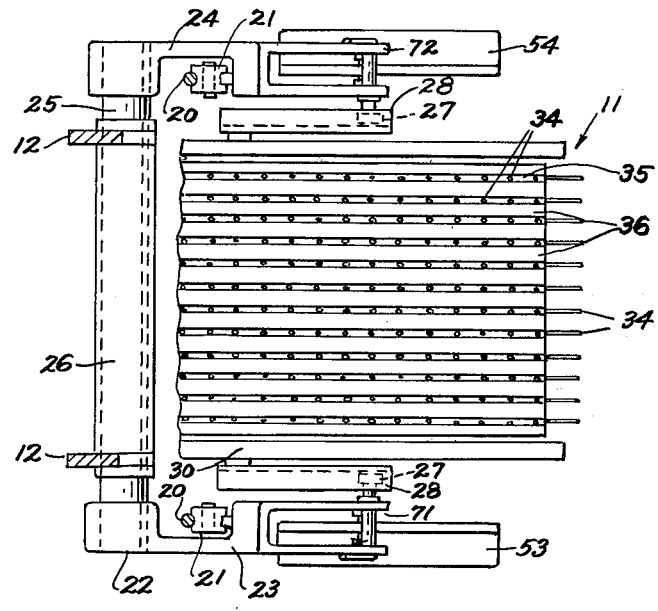
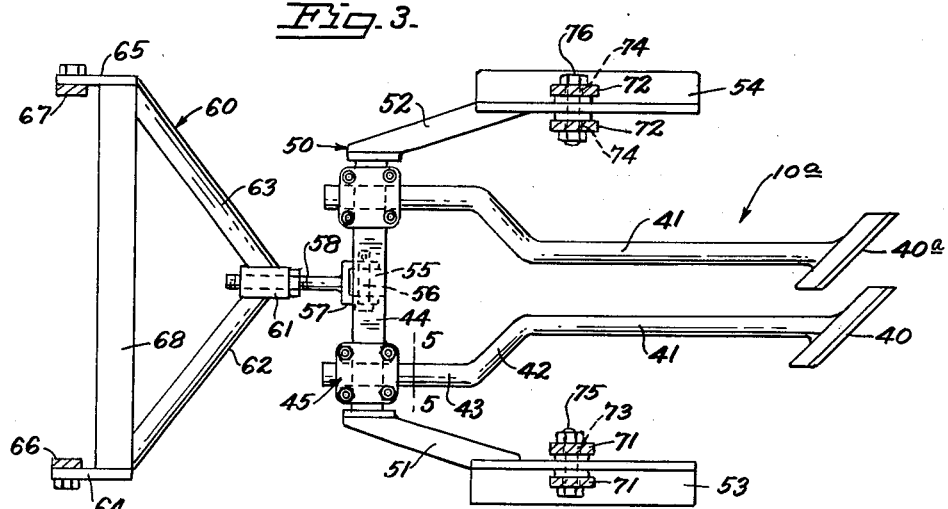
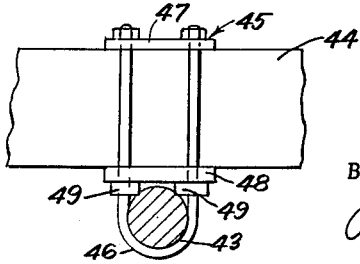
INVENTORS
FREDRICK L. HILL
BY LAUREN W. GATES
Owen, Wickersham & Erickson
ATTORNEYS

# United States Patent Office 3,196,954
Patented July 27, 1965

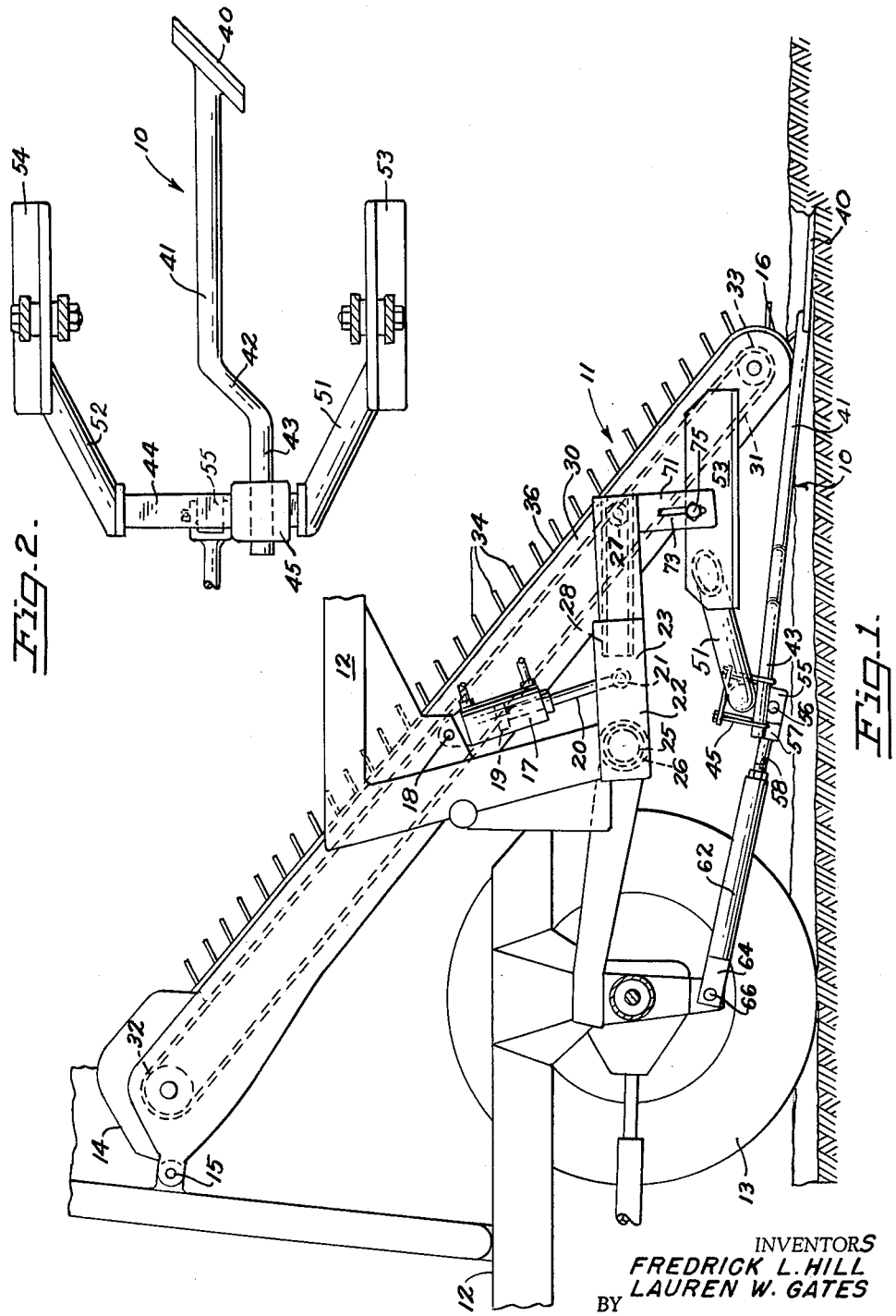

3,196,954
TOMATO HARVESTER
Fredrick L. Hill and Lauren W. Gates, Rio Vista, Calif., assignors to The Regents of The University of California, Berkeley, Calif.
Filed July 1, 1963, Ser. No. 291,672
18 Claims. (Cl. 171—62)

This invention relates to a tomato harvester of the type in which a tomato plant has its stem severed underground and then the plant is raised up by a pickup or elevator to a shaking device where the tomatoes are shaken off the plant. More particularly, the invention relates to the cutting means for severing the stems and to its relationship with the pickup device and with the main frame.

Tomato harvesters have heretofore been subject to troubles with the cutting means. Some cutters caused the earth to furrow up too much so that a great deal of dirt was picked up by the pickup means. Other types of cutters tended to become so fouled with stems and other portions of the tomato plants that they no longer worked properly. It was difficult also to achieve the proper type of cutting, to have the cutting take place at the proper level, and to prevent the blade from either riding up to the top of the ground or from diving down into the ground and breaking off its shank.

Another very serious problem has been the support of the cutter—its relations to the main frame of the harvester and to the elevator. When a blade is moved along under the surface of the ground, there is a very substantial force of reaction pushing back against it, and this force has to be transmitted in some way to the main frame. All the members subject to this force, including those that transmit it, must be made strong enough to handle it without breaking. Yet, to make the forward part of the main frame to heavy may throw it off balance and adds much weight. Moreover, the cutter structure has to be liftable out of the ground, and the elevator also has to be liftable, in order to negotiate between fields or between rows in a field. To make the supporting structure too heavy or too bulky, makes such lifting difficult.

The present invention solves the above problems and provides a greatly improved cutter as well as novel structure for lifting it along with the elevator and for carrying the rearward force of ground reaction to the main frame.

Other objects and advantages of the invention will appear from the following description of a preferred form thereof.

In the drawings:

FIG. 1 is a fragmentary view in elevation and partly in section of the front portion of a tomato harvesting unit including the pickup device and cutting means embodying the principles of this invention.

FIG. 2 is a top plan view of a cutter assembly having a single knife blade.

FIG. 3 is a top plan view of a cutter assembly having two knife blades.

FIG. 4 is a top plan fragmentary view of the forward portion of FIG. 1, with some parts broken away.

FIG. 5 is an enlarged view in section taken along the line 5—5 in FIG. 3.

In a complete unit the tomato harvester comprises not only a cutter assembly 10 and a pickup or elevator 11 but also a shaking unit where the tomatoes are shaken from the plant and other portions which are not shown in this particular patent application because they are not directly pertinent to it. However, it is important to note that when a device operates on the principle of shaking the tomatoes from the plants, it is desirable for the tomatoes to remain on the plant until they reach the shaker, that is, during the time that the plant is cut and during the time that it is riding up the elevator 11.

The harvester includes a main frame 12 which is supported on wheels 13. The pickup unit 11 is pivoted near its upper end 14 to the main frame 12 at a pivot 15, so that the front 16 of the pickup unit 11 can be swung up away from the ground, by means of a pair of hydraulic cylinders 17 (only one of which is shown in the drawings) each of which is mounted to the frame 12 by a pivot 18 and has a piston 19 and a piston rod 20. The two rods 20 are pivotally connected by links 21 to a support assembly 22. The support assembly 22 comprises two arms 23 and 24 connected to opposite ends of a cylindrical rod 25, which rotates in a tube 26 forming part of the frame 12. The forward part of each arm 23, 24 carries a roller 27 which rolls in a channel 28, the channel 28 being secured to a frame 30 for the elevator 11. Thus, the cylinder 17 and piston 19 are actuated by fluid to raise and lower the front end 16 of the pickup 11 about the pivot 15, by lifting the forward part of the frame 30 through the rolling pivot 27, 28.

The elevator 11 has an endless chain assembly 31 that is driven around an upper sprocket wheel 32 and a lower sprocket wheel 33. Tines 34, carried by the chain assembly 31, move, on their upward course, in slits 35 between a series of parallel guide rails 36. The tines 34 carry up the plants, which partly slide along over the rails 36; then the tines 34 carry the plants over the top and, leaving them, descend on the lower side of the elevator 11.

The knife assembly 10 includes a relatively short and thin knife blade 40 set diagonally (preferably 40° to 60°) and centered with respect to a long relatively small diameter suporting shank 41. A typical knife blade 40 is sixteen inches long, covering a swath about ten inches wide. At its thickest it is less than an inch thick, and typically it may be about three inches wide. The shank 41 may be steel rod about four feet long and about two inches in diameter. The shank 41 may have an offset portion 42 leading to a rear terminal portion 43. The portion 43 is secured to a square shaft 44 by a U-clamp 45. The U-clamp 45 (see FIG. 5) includes a pair of U-bolts 46, an upper pad 47, a lower pad 48, and a pair of spacers or square washers 49 that bite into the shank portion 43 and hold it against rotation. The U-clamp 45 enables one to set the length of the blade 40 from the square shaft 44 and to set the lateral tilt of the blade 40 and then to hold both, once set.

The square shaft 44 is part of a rigid support assembly 50 having welded to it forwardly and upwardly extending arms 51 and 52 from which extend forward angle irons 53, 54. At the center of the square shaft 44 is a depending ear 55 which is pivoted by a pin 56 to a yoke 57 having a rearwardly extending threaded shank 58. The offset 42 of the shank 41 avoids conflict with this central structure. A frame-connection assembly 60 has a tube 61 into which the shank 58 is threaded, and strong bars 62, 63 extend rearwardly and outwardly to end members 64, 65 that are pivoted by strong pins 66, 67 to the frame 12, preferably near the front wheels 13. A reinforcing bar 68 extends laterally across the end members 64, 65 making the assembly 60 very strong and rigid.

As the knife blade 40 moves through the ground, the force of reaction is quite strong, and in this invention it is transmitted back longitudinally of the harvester, along the shank 41 and through the shaft 44 to the assembly 60, which transmits these forces directly to the frame 12. As a result, the strongest shocks and forces reach the frame 12 along the lengthwise direction, and are not transmitted through the lifting linkage in any substantial amount. The offsetting of the shank 41 and the V-construction of the assembly 60 still transmit the forces in a lengthwise direction and resolve them in that direction at the frame 12, while the connection between the square shaft 44 and the lifting mechanism is substantially unaffected by these lengthwise forces. The connection between the assembly 60 and the frame 12 is preferably in line with or behind the front wheels 13, rather than forward of the wheels 13, so that the parts of the frame 12 forward of the wheels 13 need not be made heavy in order to absorb the rearward force of ground reaction. By transmitting these forces to the frame the machine as a whole can be better balanced and can be lighter in over-all weight, as well as being better able to handle the strong lengthwise rearward thrust against the blade 40. Moreover, since the blade 40 is short and narrow and thin and since it is mounted on a slender pole-like shank 41 and since the offset 42 is far enough back to be out of the ground, the resistance force itself is reduced greatly as compared wtih previous cutters. Reduction of this force and resolution of it into the frame 12 at the point where the front wheels 13 are mounted are important features of this invention, as is the avoidance of sending these forces through the lifting structure.

The angle irons 53, 54 are bolted to members 71, 72 that depend from and are part of the arms 23, 24, in a manner providing pivotal movement. Also, slots 73, 74 enable vertical adjustment of the bolts 75, 76 so that the distance between the angle irons 53, 54 and the arms 23, 24 can be varied in order to adjust the distance between the blade 40 and the elevator 11. When the cylinders 17 lift the elevator 11, they also lift the square shaft 44 through the pivotal connection at the bolts 75, 76, and hence they lift the knife 40, though they lift the knife 40 at a slightly different rate than they lift the elevator 11, due to the movement at each of the pivots 25, 75, 76, 55, and 66, 67.

At noted already, the invention provides for a great variety of adjustment of the knife blade 40 and of its relationship to the ground, to the frame 12, and to the elevator 11. These adjustments are provided at (a) the U-clamp 45, (b) the bolts 75, 76, (c) the threaded connection between the members 58 and 61, and (d) by the lift of the hydraulic cylinders 17.

(a) The U-clamp 45 enables three adjustments: (1) Lateral adjustment of the blade 40 by sliding the loosened clamp 45 along the square shaft 44. For example, when a tomato field is planted with one row per bed, one knife blade 40 is used, as it is usually centered (FIG. 2), although it can be to one side if the bed is planted that way. When the field is planted with two rows of plants to each bed, two knives 40 and 40a are used, as shown in FIG. 3, preferably with the knives slightly overlapping. (2) Rotational adjustment of the blade 40. With the clamp 45 loosened, the shank portion 43 may be rotated in order to tilt the blade 40 so that one end is higher than the other or so that both are level. For most level fields the blade should be level, but some sloped planting makes a slight slope of the blade 40 desirable. The bite of the spacers 49 prevents rotation when the bolts 46 are again tightened. (3) Lengthwise adjustment of the blade 40. When the clamp 45 is loosened, the shank portion 43 may be moved fore and aft of the machine. Thus the blade 40 can be located at the optimum position relative to the front end 16 of elevator 11. For some soils and other conditions it is desirable to alter this relationship, and it is easily done. Once set, it remains constant for as long as desired.

(b) The bolts 75, 76 and the slots 73, 74 enable adjustment of the vertical spacing between the knife blade 40 and the elevator 11. During this adjustment there is a very small tilting of the blade 40 about the axis of the square shaft 44, for the square shaft 44 is somewhat tilted by this adjustment; usually this amount is negligible but it can be taken care of by adjustment (c); at any rate the vertical spacing is mainly determined by this adjustment (b).

(c) Adjustment of the threaded connection between the members 58 and 61 not only shortens or lengthens the distance between the square shaft 44 and the frame 12; more important, it rotates the square shaft 44 about the axis of the pins 66 and 67, tilting the blade 40 to change its attitude or angle of attack through the ground. This is a very important adjustment, not only in order to enable resetting of the attack angle after the blade 40 has been raised or lowered relative to the elevator 11 by adjustment (b), but also because the angle of attack is varied under changes of soil conditions and different types of soil. The blade 40 should be sloped forward, about as shown in FIG. 1, and should not be horizontal as it moves through the ground. If horizontal, it tends to be forced up out of the ground by the force of movement through the earth, and the blade 40 will either actually be thrust up or the shank 41 will bend or break. Moreover, the blade 40 should not be tilted too much or it will tend to be forced down into the ground, and it will either dive down or the shank 41 will bend or break. When tilted properly, it maintains its depth in practical equilibrium. Its face is then tilted down about 5° toward the edge, the exact angle depending on the hardness of the soil and the sharpness of the blade. This adjustment (c) also changes the distance between the blade 40 and the pickup 11, but if it matters this can be readjusted. The tilt of the blade 40 is also affected by adjustments (b) and (d), and is coordinated with them.

(d) The cylinders 17 are used to lift the knife 40 completely out of the ground and to raise it and the elevator 11 away from the ground, and then to put them back down to operating position. This adjustment is the only one used during actual operation of the machine, and it is used at the beginning and end of each row and when moving the harvester between fields. Since the cylinder 17 determines the actual vertical location of the knife assembly 10 and elevator 11 during operation, the operator usually determines the position of the latter before making adjustment (b) and makes adjustment (c) after making adjustment (b). Then he lowers the knife 40 to the same position each time during the harvest in a particular field on a particular day.

Although normal vertical adjustment does not materially affect the predetermined angle-of-attack of the blade 40, the lifting of the cutter 10 and elevator 11 out from and above the ground to gain ground clearance at the end of a row or between fields does result in the upward inclination of the assembly 10, so that the clearance is greater at the knife 40 than at the shaft 44, the shank 41 then inclining upwardly from its base at the shaft 44.

With the adjustments all made, the operation of the machine is simple. As the harvester moves along, the knife blade 40 moves below the ground, with the offset 42 above ground and the elevator front end 16 above ground. The blade 40 severs the stems of the plants, and the elevator lifts the plants up for further processing.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. In a tomato harvester, the combination of:
 a wheel-supported main frame,
 an elevator having a rear and upper end pivoted to said main frame, having a forward end close to the ground, and having an endless conveyor for moving tomato plants up from ground level to said rear and upper end,
 power lift means mounted on said main frame,
 a lifting assembly pivoted to said main frame and pivotally connected to said power lift means and having a connection to said elevator, so as to raise and lower the front end of said elevator by said power lift means, a lengthwise-extending support structure below said elevator, pivoted to said main frame and having a forward end, a support assembly comprising a transverse shaft and side arms, said shaft being pivotally connected to said support structure, and said arms being pivotally connected to said lifting assembly, and a knife assembly, comprising a blade and a shank, said blade being mounted on one end of said shank forward of the forward end of said elevator, said shank being secured to said shaft.

2. The combination of claim 1 wherein a rolling pivot connects said lifting assembly to said elevator.

3. The combination of claim 1 wherein the connection between said shaft and said support structure is central and wherein said knife blade is located centrally and said shank is offset for connection to said shaft to one side of the center thereof and of the connection to said support structure.

4. The combination of claim 1 having means for adjusting the length of said support structure so as to tilt said knife blade relative to the ground.

5. The combination of claim 4 having means for adjusting the vertical spacing of said shaft relative to said elevator, for adjusting the vertical space of said knife blade relative to said elevator.

6. The combination of claim 1 having means for connecting said shank to said shaft while enabling adjustment of the shank lengthwise and rotatably relative to said shaft, to change the lateral tilt of said blade and to change the distance between said blade and the forward end of said elevator.

7. The combination of claim 1 wherein said knife blade is relatively thin and short and is mounted at an angle of 40° to 60° on said shank, and said shank is slender.

8. The combination of claim 1 wherein there are two knife assemblies, both having a blade and a shank, both shanks being mounted on said shaft.

9. The combination of claim 8 wherein said blades are mounted diagonally on said shank and have a short lateral overlap.

10. In a tomato harvester, the combination of:
a wheel-supported lengthwise extending main frame having front wheels,
a lengthwise-extending support structure pivoted to said main frame,
a support assembly comprising a transverse shaft and side arms, said shaft being pivotally connected to said support structure,
hydraulic lift means secured to said main frame,
a lifting assembly pivoted to said main frame and pivotally connected to said hydraulic lift means and pivotally connected to said support structure, so as to raise and lower said support structure by said hydraulic lift means, and
at least one knife assembly, each comprising a blade and a long, slender shank extending lengthwise of said frame and having a forward end and a rear end said blade being mounted diagonally on said forward end of said shank, the rear end of said shank being secured to said shaft, thereby providing a double pivot structure for said knife assembly so that said lifting assembly lifts said support structure through one pivotal connection, thereby causing lifting of said support assembly and said knife assembly through another pivotal connection.

11. The combination of claim 10 wherein the connection between said shaft and said support structure is central and wherein said knife blade is centered with respect to the longitudinal axis of said main frame and said shank is laterally offset for connection to said shaft to one side of said axis and of the connection to said support structure.

12. The combination of claim 10 having means for adjusting the length of said support structure so as to tilt said knife blade relative to the ground.

13. The combination of claim 12 having means for adjusting the vertical spacing of said shaft relative to said lifting assembly for adjusting the vertical space of said knife blade relative to said lifting assembly.

14. The combination of claim 10 having means connecting said shank to said shaft enabling adjustment of the shank lengthwise and rotatably relative to said shaft, to change the lateral position of said blade, to change the tilt of said blade and to change the distance between said blade and the forward end of said lifting assembly.

15. The combination of claim 10 wherein said knife blade is relatively thin and short and is mounted at an angle of 40° to 60° on said shank, and said shank is slender.

16. In a tomato harvester, the combination of:
a wheel-supported main frame having front wheels,
a lengthwise-extending support structure pivoted to said main frame,
a connector threadedly connected to said support structure and having a yoke at its forward end,
a support assembly comprising a square shaft and side arms, said square shaft extending laterally of said main frame and having a central ear depending therefrom and pivotally connected to said yoke,
a hydraulic cylinder pivoted to said main frame and having a piston and piston rod,
a lifting assembly pivoted to said main frame and pivotally connected to said piston rod and pivotally connected to said arms of said support assembly, so as to raise and lower said support assembly by said hydraulic cylinder,
at least one U-bolt assembly mounted on said square shaft for lateral adjustment thereon, and
at least one knife assembly, each comprising a blade and a long slender shank extending lengthwise of said frame and generally horizontally and having a forward end lower than a rear end, said blade being mounted diagonally on the forward end of said shank, the rear end of said shank being mounted by said U-bolt assembly to said square shaft,
whereby said lifting assembly raises and lowers said knife assembly, and
whereby the ground reaction to said blade is resolved lengthwise through said shank, shaft, and support structure to said main frame.

17. The combination of claim 16 wherein said knife blade is in line axially with said ear and wherein said shank has a laterally offset terminal portion distant from said knife, secured to said U-bolt assembly, said knife blade in normal operation moving below ground with a forward portion of said shank, said shaft and said terminal portion with the offset lying above ground at all times.

18. In a tomato harvester, the combination of:
a wheel-supported main frame having front wheels,
an elevator pivoted at its rear and upper end to said main frame at a point rear of said front wheels and having a forward end close to the ground and an endless conveyor for moving tomato plants up from ground level to said rear and upper end, said elevator having a frame with longitudinally extending channels thereon,
a hydraulic cylinder pivoted to said main frame and having a piston and piston rod,
a lifting assembly pivoted to said main frame and pivotally connected to said piston rod and having a roller that engages and rides in said channel, so as to raise and lower the front end of said elevator by said hydraulic cylinder, a lengthwise-extending support structure pivoted to said main frame, a connector threadedly connected to said support structure and having a yoke at its forward end, a support assembly comprising a square shaft and side arms, said square shaft having a central ear depending therefrom and pivotally connected to said yoke, said arms being pivotally connected to said lifting assembly, a U-bolt assembly mounted on said square shaft for widthwise adjustment thereon, and a knife assembly, comprising a blade and a shank, said blade being mounted diagonally on one end of said shank, said shank having an offset portion and a terminal portion mounted by said U-bolt to said square shaft.

References Cited by the Examiner

UNITED STATES PATENTS

| | | | |
|---|---|---|---|
| 669,908 | 3/01 | Williams | 171—124 |
| 2,614,477 | 10/52 | Habenicht | 172—308 X |
| 2,645,889 | 7/53 | Warner | 171—62 X |
| 2,663,240 | 12/53 | Bauer | 172—276 |
| 2,709,326 | 5/55 | Coombe | 56—229 |
| 2,739,519 | 3/56 | Pledger et al. | 172—763 X |
| 3,071,196 | 1/63 | Scheidenhelm | 171—62 |

ABRAHAM G. STONE, *Primary Examiner.*

ANTONIO F. GUIDA, T. GRAHAM CRAVER,
*Examiners.*